No. 775,693. PATENTED NOV. 22, 1904.
M. WILLIAMS.
METHOD OF BURNING CEMENT.
APPLICATION FILED NOV. 24, 1902.
NO MODEL. 3 SHEETS—SHEET 1.
FIG: 1
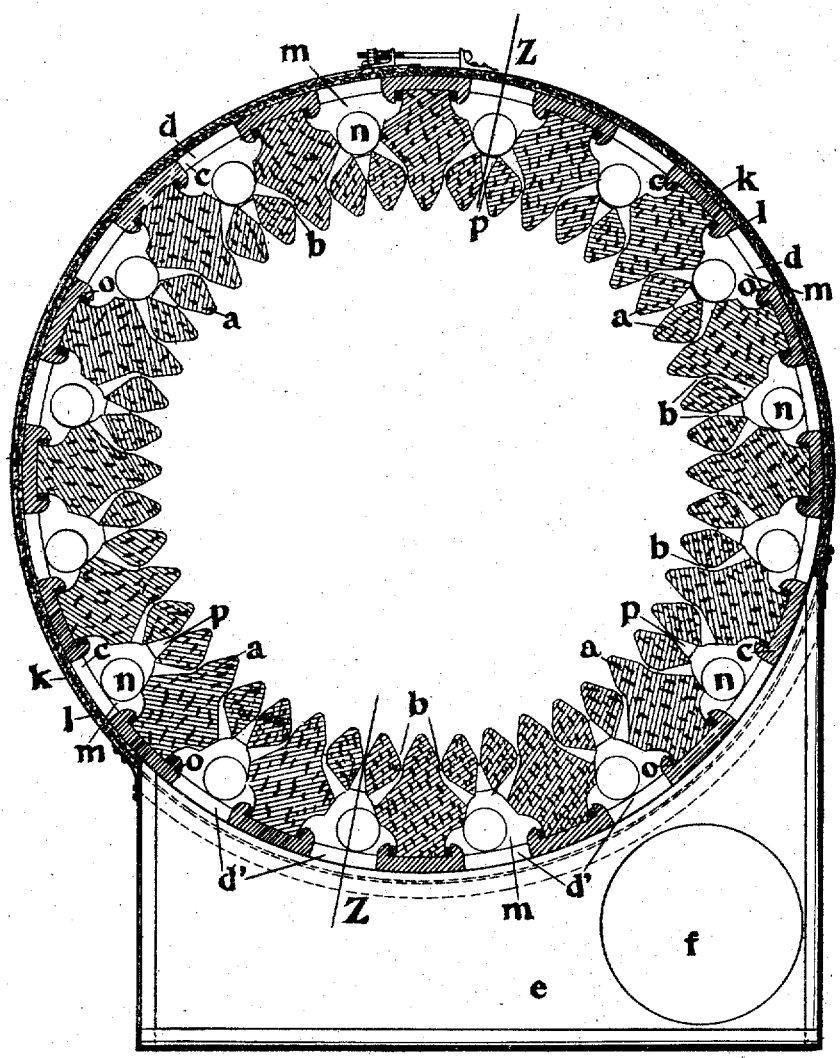
Witnesses.
F. L. Ouvand
W. H. Ouvand
Inventor.
Maxwell Williams
per W. H. Singleton,
Attorney

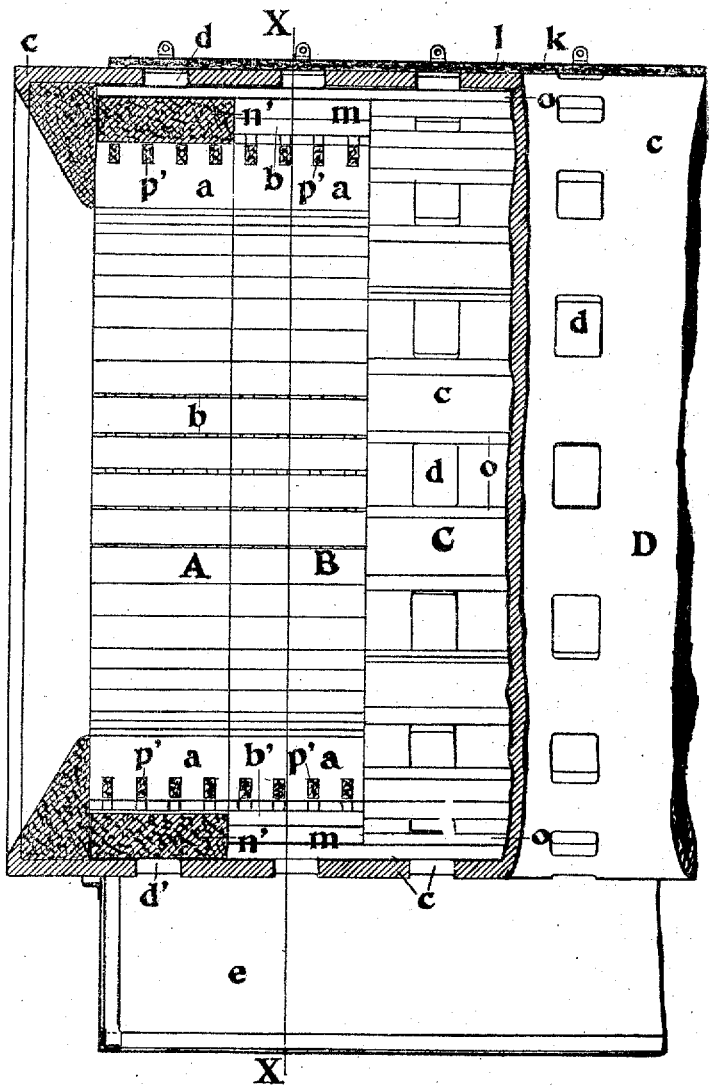

No. 775,693. PATENTED NOV. 22, 1904.
M. WILLIAMS.
METHOD OF BURNING CEMENT.
APPLICATION FILED NOV. 24, 1902.
NO MODEL. 3 SHEETS—SHEET 3.
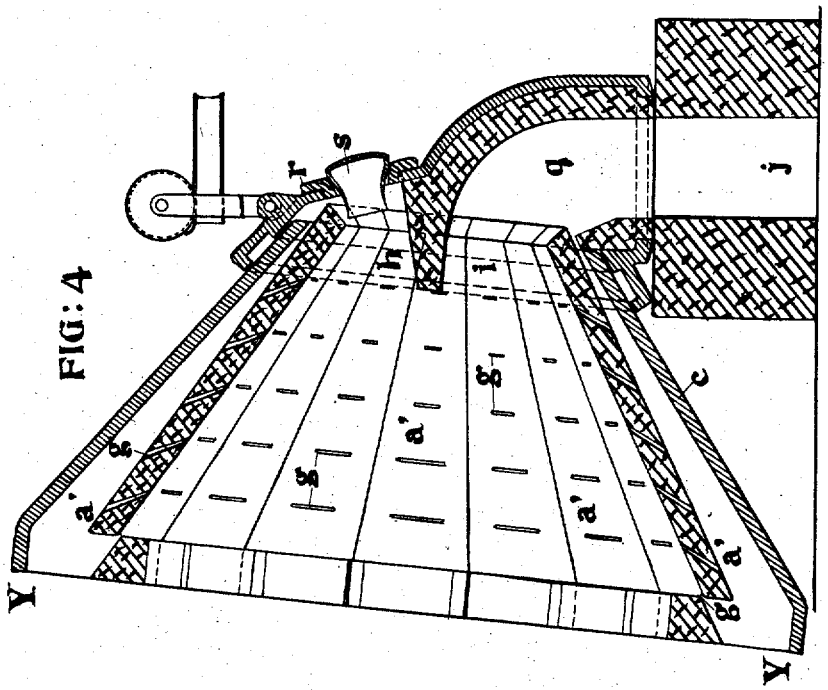
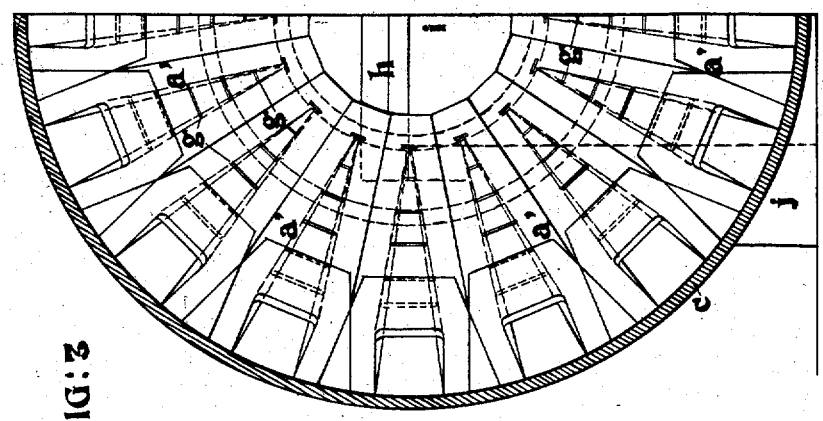
Witnesses:
F. L. Ourand
W. H. Ourand
Inventor:
Maxwell Williams,
per W. H. Singleton,
Attorney.

No. 775,693.                                    Patented November 22, 1904.

UNITED STATES PATENT OFFICE.

MAXWELL WILLIAMS, OF LONDON, ENGLAND.

METHOD OF BURNING CEMENT.

SPECIFICATION forming part of Letters Patent No. 775,693, dated November 22, 1904.

Application filed November 24, 1902. Serial No. 132,619. (No model.)

*To all whom it may concern:*

Be it known that I, MAXWELL WILLIAMS, a subject of the King of Great Britain and Ireland, of 20 Great Saint Helen's, London, in the county of Middlesex, England, have invented new and useful Improvements in Methods of Burning Cement, of which the following is a specification.

The rotary kiln in which the method is carried out is specially applicable to calcining and burning the raw material from which "Portland" cement is manufactured and in general construction is similar to kilns of the same class which have from time to time been made for that purpose. The kiln consists of a cylinder of iron or steel lined with fire-brick or fire-resisting material and is revolved slowly. The raw material is fed in at one end of the kiln, which is slightly higher than the other, and this inclination causes the raw material to travel slowly to the lower end, where it is discharged after having been burned in its passage through the kiln. The heat required to effect the chemical changes desired in the raw material is obtained by a jet or jets of gas entering at the lower end of the kiln under pressure through a conduit or conduits of fire-resisting material, and if the gas is poor or of low calorific value small coal or coke or oil is blown in with and by the gas, which enriches it, and the required temperature is both obtained and regulated, or coal or coke or oil may be injected or blown through the conduit by air only under pressure. Hereinafter the word "fuel" will be understood to mean either gas alone or gas or air with coal or coke or oil. The raw material as it travels to the lower end of the kiln first has any moisture driven off by the waste gases as they pass over it to the outlet at the upper end of the kiln and also by the red-hot lining over which it travels. The temperature of the raw material gradually rises as it meets hotter gases, and at a red heat the carbonate of lime is decomposed and the freed carbonic acid passes away with the waste gases. To effect the final chemical changes, the raw material is subjected to a temperature of nearly 3,000° by the direct action of the fuel at the moment of its combustion. That portion of the kiln in which this takes place is comparatively short, and to distinguish it from the other parts of the kiln it will hereinafter be referred to as "the region of incipient fusion," since the material at this stage becomes plastic and sticky. It is known that the raw material in this condition tends to act on a lining of fire-brick if at a white heat as a flux, causing both to melt and run together into a vitreous slag. This not only damages or destroys the lining, but also produces bad material. The rolling or sliding action of the raw material over the lining caused by the rotation of the kiln may aggravate this evil. Hitherto attempts to overcome the difficulty have been in the direction of obtaining a lining which will not soften at a high temperature or combine with the raw material, but so far without much success.

The following description and drawings relate to and illustrate only that part of a kiln to which my invention is applicable, since it is unnecessary to describe or illustrate an entire rotary kiln of the usual and well-known type. Neither do I give preference to any particular design of rotary kiln, of which there are several and to most of which my invention is equally applicable.

Figure 1 is a section through the line X X in Fig. 2 at right angles to the axis of the cylinder of that part of the kiln which I have referred to as the "region of incipient fusion;" and Fig. 2 is a view, partly in side elevation and partly in longitudinal central section, of the same part of the kiln.

In my kiln the lining in the region of incipient fusion instead of being a solid ring consists of a belt $a\ a\ a\ a$, of fire-brick or other fire-resisting substance, perforated by holes or slits $b\ b\ b\ b$ or $b'\ b'\ b'$ in the direction of or at an angle to the axis of the cylinder and forming a circular grate over which the material passes to the lower end of the kiln, and this portion of the kiln-lining will hereinafter be referred to as the "grate." That part of the outer or metal case $c\ c\ c\ c$ of the kiln in which this grate is situated is also perforated with holes $d\ d\ d\ d$ or $d'\ d'\ d'$. A light casing or box $e$, of iron or steel or other suitable material, lies close against and open to that portion of the cylinder in the region of incipient fusion, which will always be covered by a layer of the raw material when the kiln is revolving and which will be near the lowest part of the interior of the kiln. This box or casing will hereinafter be called the "air-distributer." The edges of the air-distributer are kept in close and air-tight contact with the outside of the cylinder. The action of this part of the kiln is as follows: Air under pressure is blown into the air-distributer at $f$ and passing through those holes $d'$ $d'$ $d'$ in the cylinder-case which happen at the time to be over it issues from the slits $b'$ $b'$ $b'$ in the lining under the raw material, through which it forces its way. The air tends to blow the material a little distance upward into the jet of fuel which is directed from above onto the red-hot material. The fuel at the same time meeting the air necessary for its combustion burns freely, and the inrush of the air is sufficiently strong to prevent the material from falling through or choking the slits. The fire-brick grate is cooled down by the air passing through it, and the air is heated in its passage through the red-hot grate. The jets of air also toss and tumble the material over and over, and so expose it more effectually to the action of the burning fuel than if it lay or slid in a dense mass over the lining. The burned material is finally discharged at the lower end of the cylinder into a closed bin, or the end of the kiln may be shaped like a bell or cone, with a grate somewhat similar to that already described, but with the slits running circumferentially or spirally.

Fig. 3 is a cross half-section (at Y Y in Fig. 4) of the casing with a cone-shaped end looking toward the outlet and showing the interior lining and slits $g$ $g$ $g$ $g$ and the outlet. Fig. 4 is a longitudinal vertical section through the axis of the cylinder of the same part. By this latter arrangement the grate forms a series of short steps from which the jets of air issue toward the outlet. The outlet is a circular orifice in the center of the end of the kiln only large enough for the fuel-conduit to pass through, the conduit being shaped or flattened at the bottom $h$ to allow a gap or outlet $i$ under it of sufficient area to permit the burned material to pass out. The burned material as it arrives at the lowest of the circumferential slits is blown up to the next and again to the next above that until by successive steps it reaches and is projected through the outlet into a small closed bin $j$ or a chute. Through this closed bin or chute the air may be drawn or forced by a fan or blowing-engine before being delivered into the air-distributer. This cools the burned material and heats the air necessary for the combustion of the fuel. Since the fire-brick grate and the holes in the cylinder for the ingress of the air obviously offer a considerable area of escape from the kiln for the hot gases, a sleeve $k$, of iron or steel, which may be lined with some fire-resisting material, such as asbestos, $l$ fits closely round the cylinder and over all those holes not in direct communication with the air-distributer. To further prevent the escape of heat to this sleeve, the fire-brick lining which forms the grate is so constructed that the slits are divided into groups, each group having a common chamber $m$ $m$ $m$, with which each slit in the group communicates. In each chamber there is a roller $n$ $n$ $n$, of fire-resisting material, either solid or hollow, which rolls freely in the chamber, so that when at or near the lowest position in course of rotation this roller lies away from and clear of the slits, so as not to obstruct the passage of the inrushing air to the interior of the kiln. As each chamber during the revolution of the kiln successively rises the roller it contains rolls over and covers the slits and prevents the hot gases from passing outward to the casing. By another arrangement the same object is attained by each slit having a small roller which acts in a similar manner. The air-distributer herein described is a fixture; but it may equally well be a cylindrical air-jacket covering that portion of the cylinder of the kiln through which the perforated lining or grate extends and revolving with it. Such a jacket is divided into sections corresponding to the chambers $m$ $m$ $m$ $m$, and the air is blown into each section during that part of its revolution which brings it under the raw material in its passage to the outlet $i$. The rollers $n$ $n$ $n$ are not essential when a sleeve $k$ $l$ is used, or with a revolving air-jacket. Neither is the sleeve $k$ $l$ absolutely necessary when the chambers have rollers, and their adoption or otherwise will depend on the speed of rotation and the pressure in the kiln. The base of the fire-blocks $a$ $a$ $a$ $a$, forming the grate, is slightly dovetailed and is fixed with fire-clay in lugs $o$ $o$ $o$ $o$ in the metal cylinder. To further secure and strengthen these blocks, narrow fire-brick wedges $p$ $p$ $p$ $p$ are drawn in between each pair of blocks, leaving air-spaces between, and these wedges correspond to the ribs which unite the side portions of the block to its body. Any single block can be drawn for renewal without disturbing the remainder by knocking out these wedges and removing the fire-clay at the base of the block. The sleeve $k$ is formed of thin sheets of metal lapping at the top and kept in close contact with the cylinder by springs set up with bolts which can be adjusted to maintain sufficient contact without causing undue resistance to the rotation of the kiln.

In Fig. 2, A is a vertical section through Z Z, the axis of the cylinder in Fig. 1 showing one ring of fire-blocks $a$ $a$ and a top and bottom roller $n$ $n$ in section and the wedges $p'$ $p'$ $p'$ in section. B is the same section, but with the rollers removed. C is the same section with the rollers and blocks removed and showing the air-holes *d d d d* and the lugs *o o o o*. D is a view of the outside of the cylinder with the sleeve removed to show the air-holes. In this figure the air-distributer case *e* and the sleeve *k l* are shown in section through a vertical line passing through the center of the cylinder. That part of the kiln herein illustrated, and which I have referred to "as the region of incipient fusion," may be of any suitable length, but would only be a repetition of the views A, B, C, and D.

In Figs. 3 and 4, *a' a' a' a'* are the fire-brick blocks, forming a continuation of the grate *a a a a* from the ring A in Fig. 2. *q* is a removable metal hood lined with fire-brick coned and grooved to fit the end of the cylinder-cone and forming a communication between *i* and *j*. *r* is a removable door in which is fitted one or more adjustable nozzles *s* for delivering the fuel into the kiln.

In the foregoing description and drawings one arrangement only is described and illustrated, although in the methods which I specifically state and claim to be novel several variations in the details of construction are possible for attaining the objects of my invention. My invention therefore is not confined to those details of construction in the example herein described and illustrated for carrying into effect the methods I claim to be novel.

By this invention the fluxing already referred to is prevented, and the material produced is of better quality. The lining lasts longer, requires less repair, and is easily renewed. The intense heat which is absorbed by the lining in the hottest part of the kiln is utilized to heat the air required for combustion. The air for combustion is caused to convey back to the furnace heat which would otherwise be expended in gradually destroying the lining and in radiating from the cylinder. The effect of the combustion of the fuel instead of being concentrated on a small area, such as a long flame made by air and fuel being blown together would tend to cause, is distributed over an area represented by that of the air-distributer or of the whole surface of the material passing over the grate.

Having described my invention, what I claim as new and desire to secure by Letters Patent, is—

1. An improvement in the method of burning cement and preventing the material from fluxing and adhering to the lining of a kiln which consists in forcing air of ordinary temperature under pressure through such lining, cooling the latter, and against and into the material to be burned and tumbling and tossing the latter about and forcing it off from the lining.

2. An improvement in the method of burning cement and preventing the material from fluxing and adhering to the lining of a kiln which consists in forcing air of ordinary temperature under pressure in jets through such lining, cooling the latter, and against and into the material to be burned, tumbling and tossing the latter about and forcing it off from the lining.

MAXWELL WILLIAMS.

Witnesses:
H. D. JAMESON,
A. NUTTING.